United States Patent [19]
King

[11] Patent Number: 5,806,199
[45] Date of Patent: Sep. 15, 1998

[54] THREE-DIMENSIONAL PART MEASUREMENT SYSTEM

[75] Inventor: Charles W. King, Rochester, N.H.

[73] Assignee: Everett Pattern & Manufacturing Inc., Middleton, Mass.

[21] Appl. No.: 756,056

[22] Filed: Nov. 26, 1996

[51] Int. Cl.⁶ .................................................. G01B 5/20
[52] U.S. Cl. ................................. 33/552; 33/553; 33/557
[58] Field of Search .............................. 33/1 M, 546, 551, 33/552, 553, 554, 556, 557, 561, 600, 530, 531, 548, 560, 613, 792, 802, 833

[56] References Cited

U.S. PATENT DOCUMENTS

| | | | |
|---|---|---|---|
| 2,593,986 | 4/1952 | Comstock | 33/548 |
| 3,323,220 | 6/1967 | Crist et al. | 33/551 |
| 3,597,849 | 8/1971 | Gaal | 33/552 |
| 3,708,885 | 1/1973 | Christ | 33/548 |
| 4,122,607 | 10/1978 | Hopf | 33/561 |
| 4,322,887 | 4/1982 | Burton | 33/552 |
| 4,554,747 | 11/1985 | Williams | 33/553 |
| 4,603,487 | 8/1986 | Matsunata | 33/556 |
| 4,718,172 | 1/1988 | Rouse et al. | 33/530 |
| 4,953,306 | 9/1990 | Weckenmann et al. | 33/552 |
| 5,009,512 | 4/1991 | Lessi et al. | 33/560 |
| 5,276,974 | 1/1994 | Chanoni et al. | 33/554 |
| 5,301,436 | 4/1994 | Johnston | 33/551 |
| 5,343,627 | 9/1994 | Hesseltine | 33/551 |
| 5,515,615 | 5/1996 | Twigg et al. | 33/551 |

FOREIGN PATENT DOCUMENTS 2 253 700  9/1992  United Kingdom ..................... 33/551

Primary Examiner—G. Bradley Bennett
Attorney, Agent, or Firm—Iandiorio & Teska

[57] ABSTRACT

A three-dimensional part measurement system includes a base; at least two guides in the base extending along a first dimension of the part to be measured; a carriage; at least three followers supporting the carriage and movable along the guides to follow the part in the first dimension; and a first gauge mounted on the carriage for measuring deviations of the part in a second dimension and a second gauge mounted on the carriage for measuring deviation of the part in a third dimension.

12 Claims, 5 Drawing Sheets

THREE-DIMENSIONAL PART MEASUREMENT SYSTEM

FIELD OF INVENTION

This invention relates to a three-dimensional part measurement system.

BACKGROUND OF INVENTION

Conventional three-dimensional part measurement systems are used to inspect a part and verify the accuracy or deviation of its contour from a standard or ideal. Such measurement systems typically use a number of measurement stations spaced along a part such as an automobile bumper. The number of individual gauges required depends upon both the resolution desired and the size of the parts: larger parts and higher resolutions require more gauges. Gauges are a significant cost of the system and require constant monitoring to assure their accuracy and proper functioning. Often for precision applications periodic certification of each gauge is necessary. And each gauge must be carefully set and read to ensure accurate results. Because of the delicateness of these systems measurements are generally required to be made off the production floor in a laboratory environment.

SUMMARY OF INVENTION

It is therefore an object of this invention to provide an improved three-dimensional part measurement system.

It is a further object of this invention to provide such a three-dimensional part measurement system which can measure every point along a part.

It is a further object of this invention to provide such a three-dimensional part measurement system which requires but one measurement station to measure the entire part.

It is a further object of this invention to provide such a three-dimensional part measurement system which is simpler and easier to use.

It is a further object of this invention to provide such a three-dimensional part measurement system which enables precision part measurement in production environments.

The invention results from the realization that a truly efficient three-dimensional part measuring system which can measure in a production environment the accuracy of a part in the three dimensions at a multiplicity of points along the part using a simple measuring station can be achieved using a carriage mounted measuring station that moves along a guided path in a first dimension and measure deviations in the second and third dimensions.

This invention features a three-dimensional part measurement system including a base, at least two guides in the base extending along a first dimension of the part to be measured, and a carriage. There are at least three followers supporting the carriage and movable along the guides to follow the part in the first dimension. There is a first gauge mounted on the carriage for measuring deviations of the part in a second dimension and a second gauge mounted on the carriage for measuring deviation of the part in a third dimension.

In a preferred embodiment there may be two guides and there may be two followers, one associated with one guide and one associated with the other. There may be three guides with one follower associated with each guide. The followers may include tooling balls. The first, second and third dimensions may be mutually orthogonal. The first and second gauges may include micrometers or they may include go/no-go indicator members, or one of each. The guides may be tracks and the guides may be curvilinear. The guides may be parallel to one another and they may be parallel to the part to be measured.

In another construction the invention features a three dimensional part measurement system including a base guideway, a wall guideway transverse to aid base guideway and a carriage. There are at least three followers supporting the carriage on the base guideway and movable along it to follow the part in a first dimension. At least two followers extend from the carriage to contact the wall guideway. A first gauge is mounted on the carriage for measuring deviations of the part in a second dimension and a second gauge mounted on the carriage for measuring diameter of the part in a third dimension.

DISCLOSURE OF PREFERRED EMBODIMENT

Other objects, features and advantages will occur to those skilled in the art from the following description of a preferred embodiment and the accompanying drawings, in which.

Figure 1:
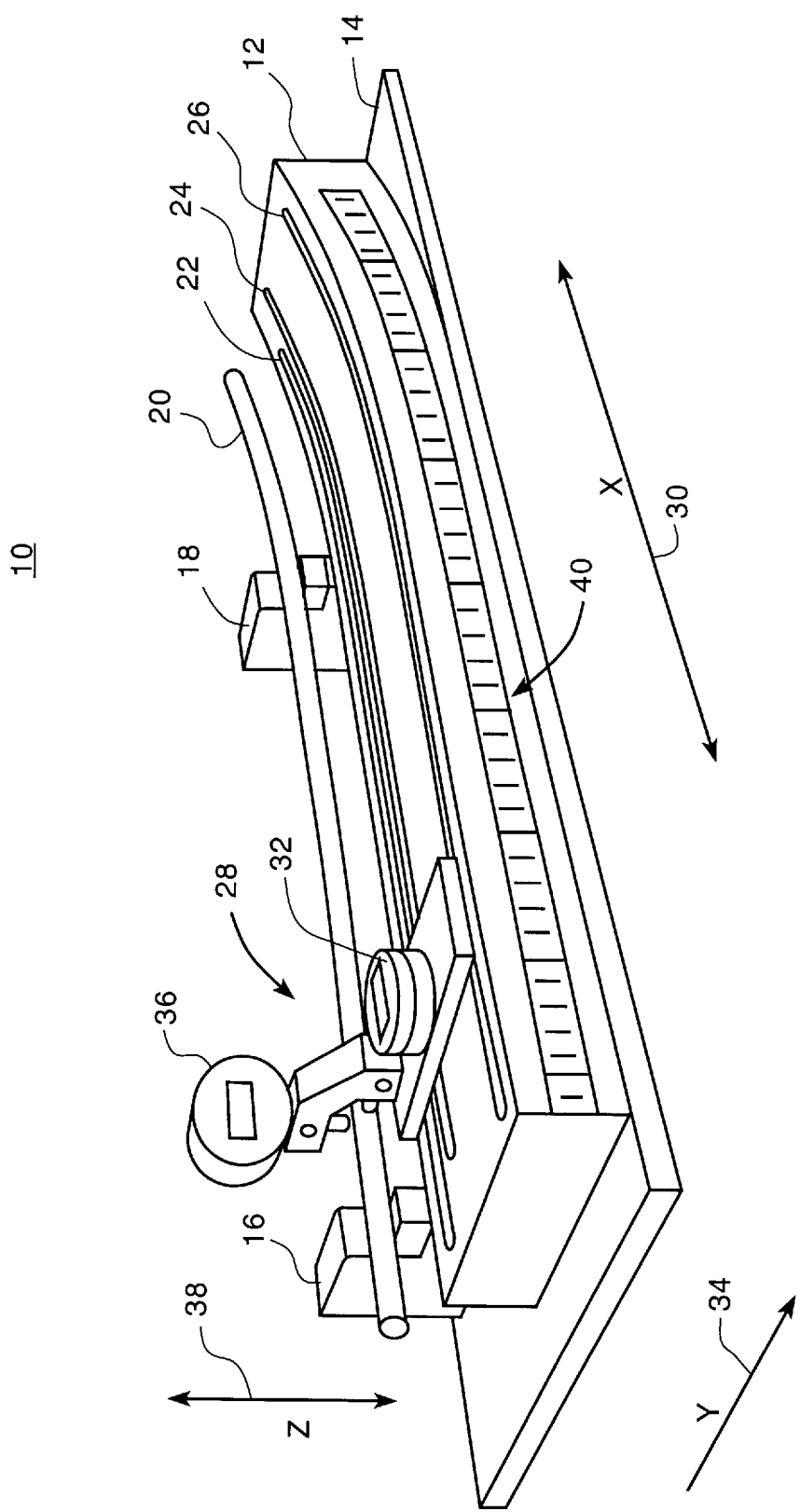
FIG. 1 is a three-dimensional view of a three-dimensional part measurement system according to this invention including two micrometer gauges.

There is shown in FIG. 1 a three-dimensional part measurement system 10 according to this invention including base 12 mounted on plate 14 and two work-holding jigs 16 and 18 which hold the three-dimensional part 20 to be measured. In this preferred embodiment base 12 includes three tracks 22, 24, 26 which are preferably but not necessarily parallel to each other and to the part 20 to be measured. Carriage 28 is guided back and forth in the first dimension as indicated by the X direction, arrow 30, by the tracks 22, 24 and 26. A first gauge 32 which can be a micrometer gauge, measures the deviation of part 20 in the Y direction as indicated by arrow 34. A second micrometer gauge 36 measures the deviation of part 20 in the Z direction as indicated by arrow 38. A scale 40 may be reproduced on base 12 so that the position of carriage 28 along the X dimension 30 can be easily read out.

Figure 2:
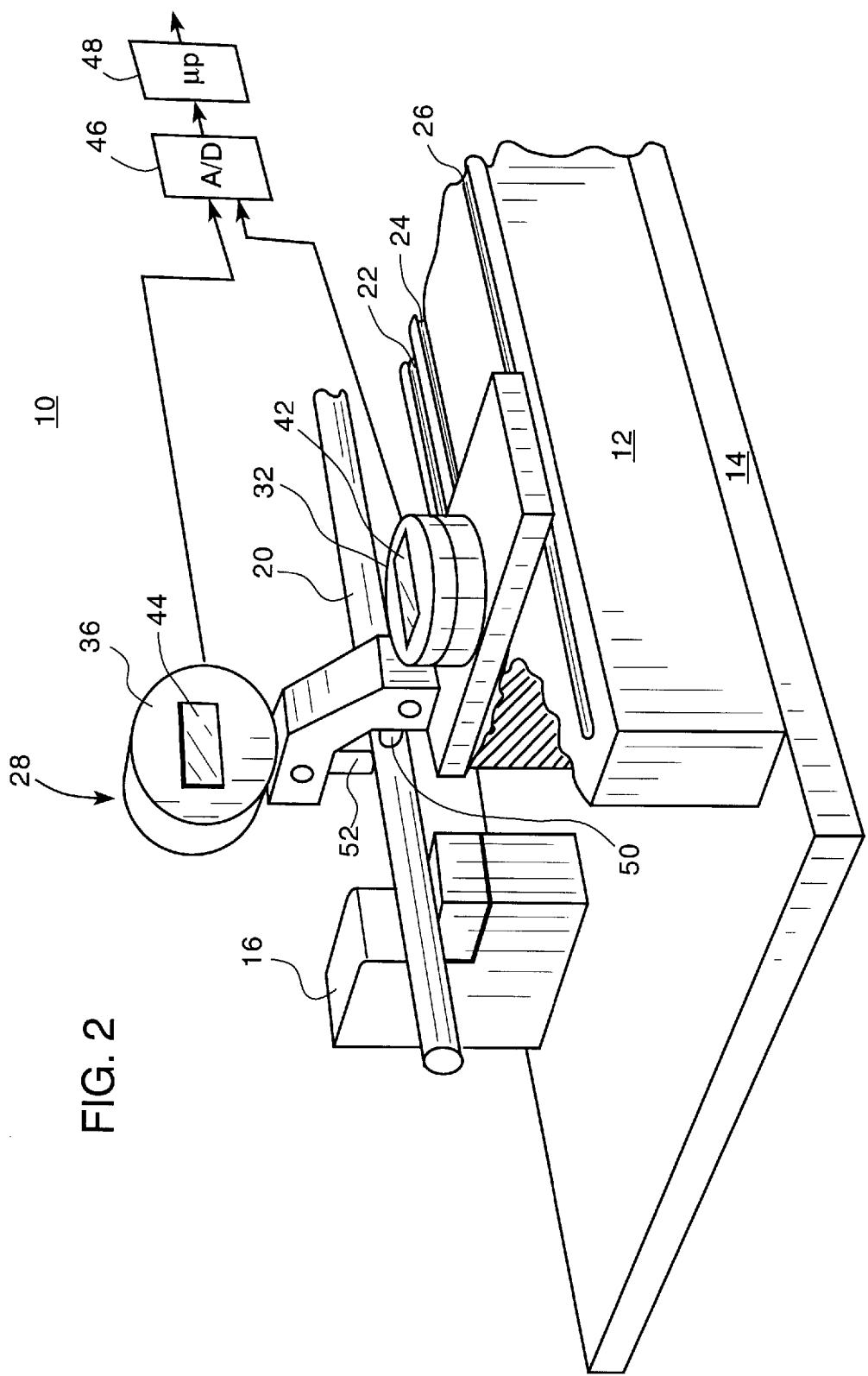
FIG. 2 is an enlarged detailed partially broken away view of the system of FIG. 1.
Figure 3:
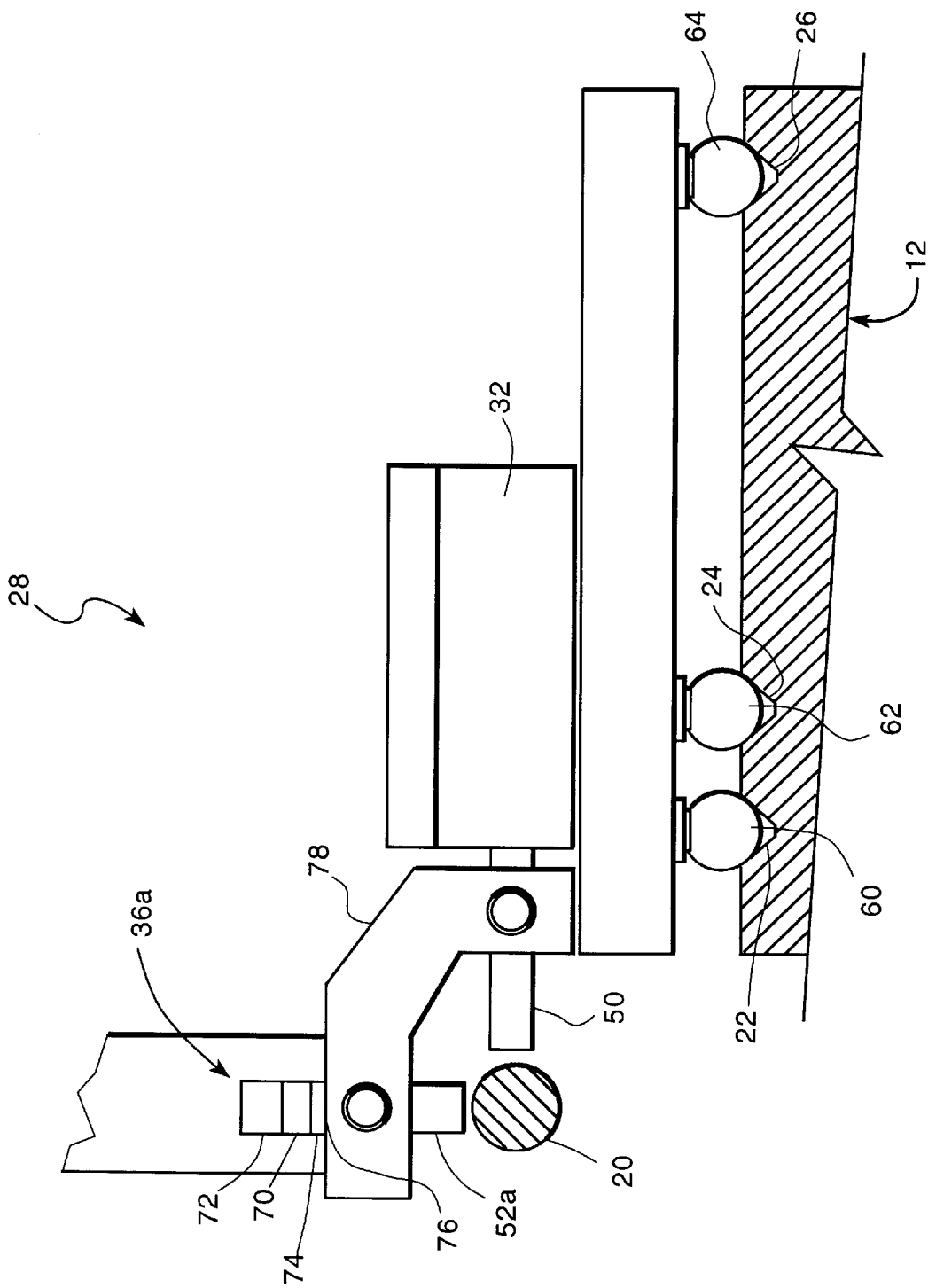
FIG. 3 is a side elevational view of the carriage of FIGS. 1 and 2 with portions shown in cross-section and one of the micrometer gauges being replaced with a go/no-go gauge.

As shown in FIG. 2, gauges 32 and 36 may be read out on digital display screens 42, 44, respectively, and/or their outputs may be fed through an A to D converter 46 or other data acquisition device, for example, to a microprocessor 48 to the overall manufacturing control system. The output of gauges 42 and 44, however, forms no part of this invention. Micrometer gauge 42 includes a sensor element 50 which rides on the side of part 20 while micrometer gauge 36 contains a sensor element 52 which rides on the top of part 20. Carriage 28, FIG. 3, is supported on two or more followers. In the preferred embodiment of FIG. 3 there are three such followers implemented by tooling balls 60, 62 and 64 which are guided by tracks 22, 24 and 26.

In FIG. 3, micrometer gauge 36 has been replaced by go/no-go gauge 36a which for example may contain a "go"

area 70 which may be green in color, for example, and a no-go area on either side of it, 72 and 74, which may be red. If either red section 72 or 74 are visible above the surface 76 of gauge mounting arm 78, then the part is outside of tolerance; if the green band 70 is at the surface 76 then the part is in tolerance. Of course, either one or both of the gauges can be go/no-go gauges. Although the tracks are shown to be truncated triangles in cross-section, that is not a necessary limitation of the invention as they may be hemispherical or any other suitable cross-sectional shape.

Figure 4:
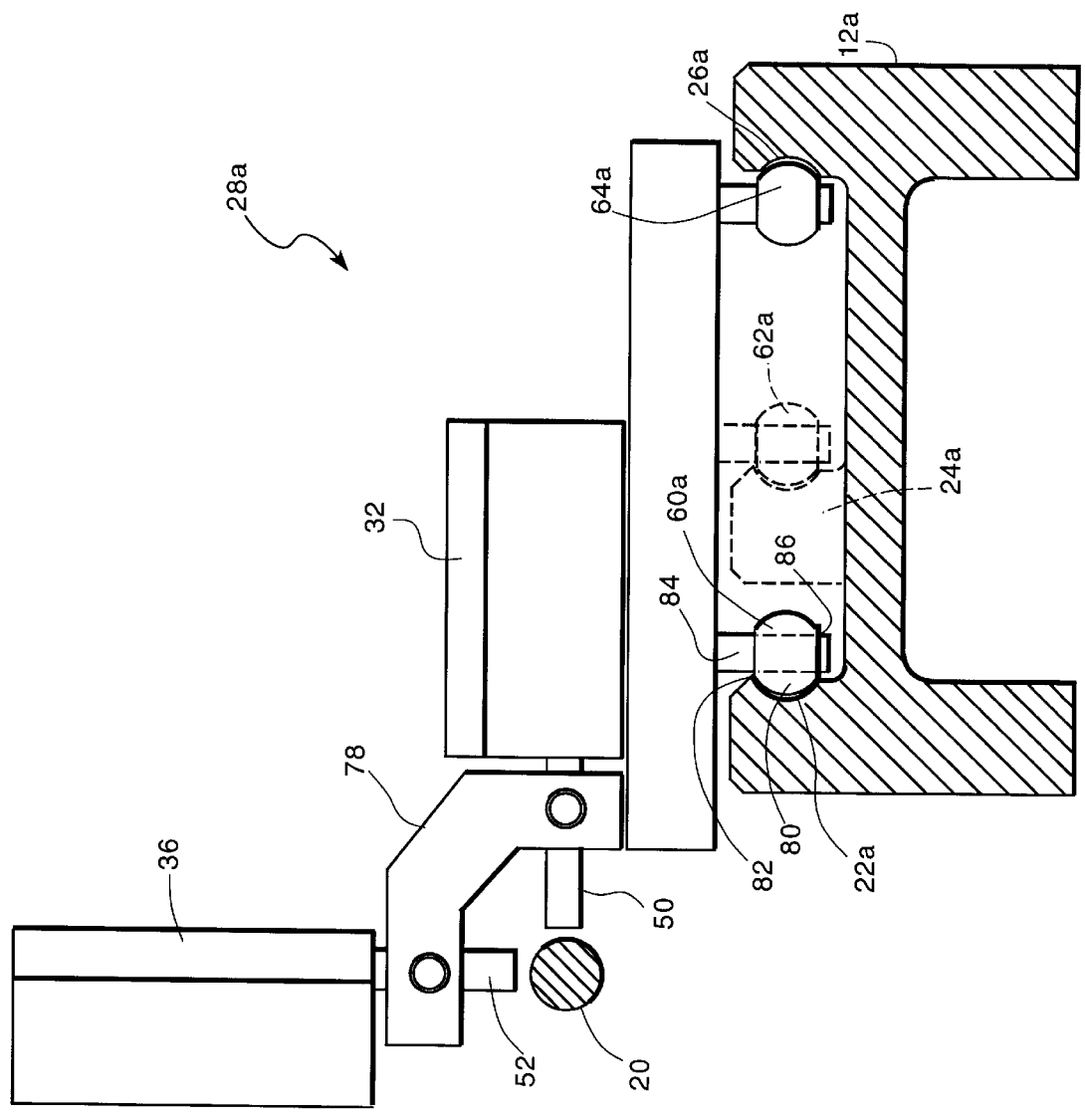
FIG. 4 is a view similar to FIG. 1 with an alternative vertical track construction.

In addition, although thus far the invention has been constructed with three tracks or guides and three followers or tooling balls, this too is not a necessary limitation of the invention. For example, as shown in FIG. 4, carriage 28a includes but two vertical tooling balls 60a and 64a which are guided in guides or tracks 22a and 26a. If desired, of course, a third track or guide 24a may be added in conjunction with the third tooling ball 62a. Each of the tooling balls, as exemplified by tooling ball 22a, may actually be a semi-spherical ball 80 with a central cylindrical hole 82 through it that mounts on stud 84 which could be steel or Teflon, for example, to allow semi-spherical ball 80 to rotate. A clip such as a D-ring or similar device 86 may be used to hold semi-spherical ball 80 on stud 84.

Figure 5:
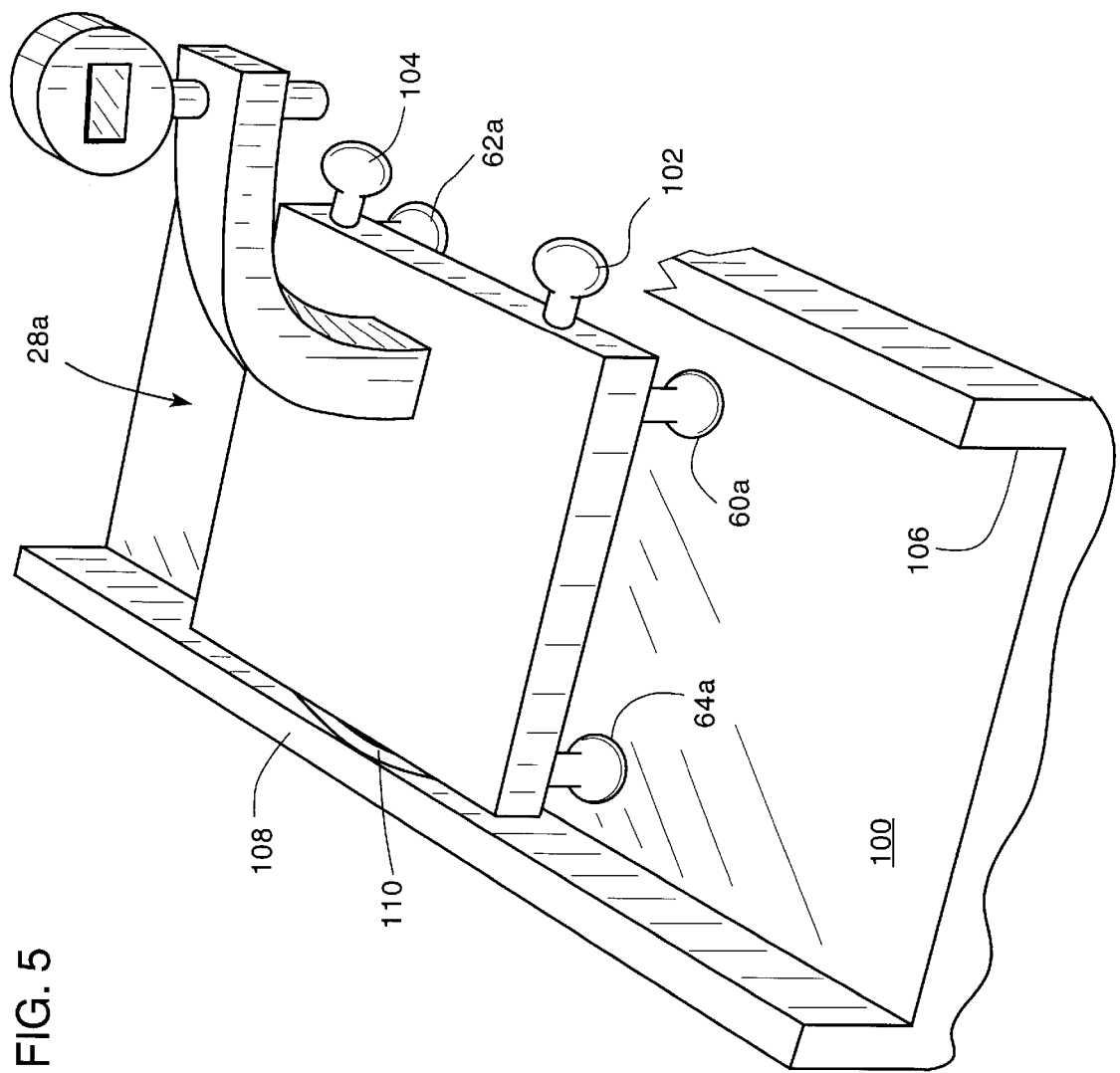
FIG. 5 is a schematic three-dimensional view of another construction of a three-dimensional part measurement system according to this invention.

In another embodiment carriage 28a, FIG. 5, may include at least three followers, tool balls 60a, 62a, 64a, which are guided on base guideway 100, and at least two followers, tool balls 102, 104, which are guided on wall guideway 106 which is transverse, in this embodiment, perpendicular to, base guideway 100. A biasing bar 108 bears against spring 110 to constrain carriage 28a to move with follower 102, 104 against wall guideway 106. A similar bar and spring, not shown, could be used to bear down on carriage 28a to constrain follower 60a, 62a, 64a to remain in contact with base guideway 100 if the weight of carriage 28a is not sufficient.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A three-dimensional part measurement system comprising:
    a base;
    at least two guides in said base extending along a first dimension of the part to be measured;
    a carriage;
    at least three followers supporting said carriage and moveable along said guides to follow the part in the first dimension;
    a first gauge mounted on said carriage for measuring deviations of the part in a second dimension transverse to said first dimension; and
    a second gauge mounted on said carriage for simultaneously measuring deviation of the part in a third dimension transverse to said first and said second dimensions.

2. The three-dimensional part measurement system of claim 1 in which there are two guides and there are two followers associated with one guide and one follower associated with the other.

3. The three-dimensional part measurement system of claim 1 in which there are three guides and there is one follower associated with each guide.

4. The three-dimensional part measurement system of claim 1 in which the followers include tooling balls.

5. The three-dimensional part measurement system of claim 1 in which said first, second and third dimensions are mutually orthogonal.

6. The three-dimensional part measurement system of claim 1 in which said first and second gauges include micrometers.

7. The three-dimensional part measurement system of claim 1 in which first and second gauges include go/no-go indicator members.

8. The three-dimensional part measurement system of claim 1 in which said guides are tracks.

9. The three-dimensional part measurement system of claim 1 in which said guides are curvilinear.

10. The three-dimensional part measurement system of claim 1 in which said guides are parallel to one another.

11. The three-dimensional part measurement system of claim 1 in which said guides are parallel to the part to be measured.

12. A three-dimensional part measurement system comprising:
    a base guideway;
    a wall guideway transverse to said base guideway;
    a carriage;
    at least three followers supporting said carriage on said base guideway and movable along said base guideway to follow the part in a first dimension;
    at least two followers extending from said carriage to contact said wall guideway;
    a first gauge mounted on said carriage for measuring deviations of the part in a second dimension transverse to said first dimension; and
    a second gauge mounted on said carriage for simultaneously measuring deviation of the part in a third dimension transverse to said first and said second dimensions.

* * * * *